(12) United States Patent
Carnevali

(10) Patent No.: US 8,136,217 B2
(45) Date of Patent: Mar. 20, 2012

(54) RECONFIGURABLE CONSOLE MOUNT

(76) Inventor: Jeffrey D. Carnevali, Seattle, WA (US)

( * ) Notice: Subject to any disclaimer, the term of this patent is extended or adjusted under 35 U.S.C. 154(b) by 489 days.

(21) Appl. No.: 12/380,387

(22) Filed: Feb. 26, 2009

(65) Prior Publication Data

US 2010/0090489 A1    Apr. 15, 2010

Related U.S. Application Data

(63) Continuation-in-part of application No. 12/287,622, filed on Oct. 10, 2008, now Pat. No. 7,802,832.

(51) Int. Cl.
*B23P 11/00* (2006.01)
*B60R 99/00* (2009.01)
*B32B 37/00* (2006.01)

(52) U.S. Cl. .......... 29/525.01; 296/24.34; 156/245

(58) Field of Classification Search ......... 29/525.01, 29/428, 455.1, 462; 296/24.34, 37.8, 70; 156/245; 361/829
See application file for complete search history.

(56) References Cited

U.S. PATENT DOCUMENTS

| | | | |
|---|---|---|---|
| 1,417,401 A | 5/1922 | Mahoney | |
| D218,438 S | 8/1970 | Shook et al. | |
| 3,550,001 A | 12/1970 | Hanley | |
| 3,984,161 A | 10/1976 | Johnson | |
| 4,313,646 A | 2/1982 | Millhimes et al. | |
| D279,329 S | 6/1985 | Dzak | |
| 4,733,900 A | 3/1988 | Fluharty | |
| 4,846,382 A | 7/1989 | Foultner et al. | |
| 5,005,898 A | 4/1991 | Benedetto et al. | |
| 5,174,621 A | 12/1992 | Anderson | |
| 5,181,555 A | 1/1993 | Chruniak | |
| 5,199,772 A | 4/1993 | Jordan | |
| 5,259,655 A | 11/1993 | Anderson | |
| 5,282,556 A | 2/1994 | Bossert | |
| 5,418,836 A | 5/1995 | Yazaki | |
| D363,916 S | 11/1995 | Johnson | |
| 5,503,565 A | 4/1996 | McCoy | |
| 5,680,974 A | 10/1997 | Vander Sluis | |
| 5,743,585 A | 4/1998 | Pranger et al. | |
| 6,048,020 A | 4/2000 | Gronowicz et al. | |
| D425,475 S | 5/2000 | Herer | |
| 6,062,623 A | 5/2000 | Lemmen | |
| 6,086,129 A | 7/2000 | Gray | |
| D429,209 S | 8/2000 | Inchaurregui | |
| D429,684 S | 8/2000 | Johnson | |
| 6,123,377 A | 9/2000 | Lecher et al. | |
| D434,365 S | 11/2000 | Herer et al. | |
| 6,176,534 B1 | 1/2001 | Duncan | |
| D437,299 S | 2/2001 | Johnson | |
| D438,841 S | 3/2001 | Smith | |
| D443,246 S | 6/2001 | Smith | |
| D443,855 S | 6/2001 | Herer et al. | |
| D447,998 S | 9/2001 | Pfeiffer et al. | |
| D453,318 S | 2/2002 | Moore | |
| 6,388,881 B2 | 5/2002 | Yamauchi et al. | |
| 6,428,072 B1 | 8/2002 | Moore | |
| 6,709,041 B1 | 3/2004 | Hotary et al. | |
| 7,165,687 B1 | 1/2007 | Stevens et al. | |
| 7,210,725 B2 | 5/2007 | Moore | |
| 7,407,210 B2 | 8/2008 | Arbaugh et al. | |
| 7,802,832 B2 * | 9/2010 | Carnevali | 296/24.34 |

(Continued)

*Primary Examiner* — John C Hong

(74) *Attorney, Agent, or Firm* — Charles J. Rupnick, Attorney at Law

(57) ABSTRACT

A reconfigurable vehicle console having a plurality of interchangeable overlapping blank and equipment mounting face plates, including both tongue-and-groove joints between adjacent face plates, as well as optional lap joints.

21 Claims, 9 Drawing Sheets

U.S. PATENT DOCUMENTS 7,891,719 B2 * 2/2011 Carnevali .................. 296/24.34
7,914,059 B2 * 3/2011 Carnevali .................. 296/24.34
2005/0035618 A1 2/2005 Toth et al.
2009/0072565 A1 3/2009 Mayne, Jr.

* cited by examiner

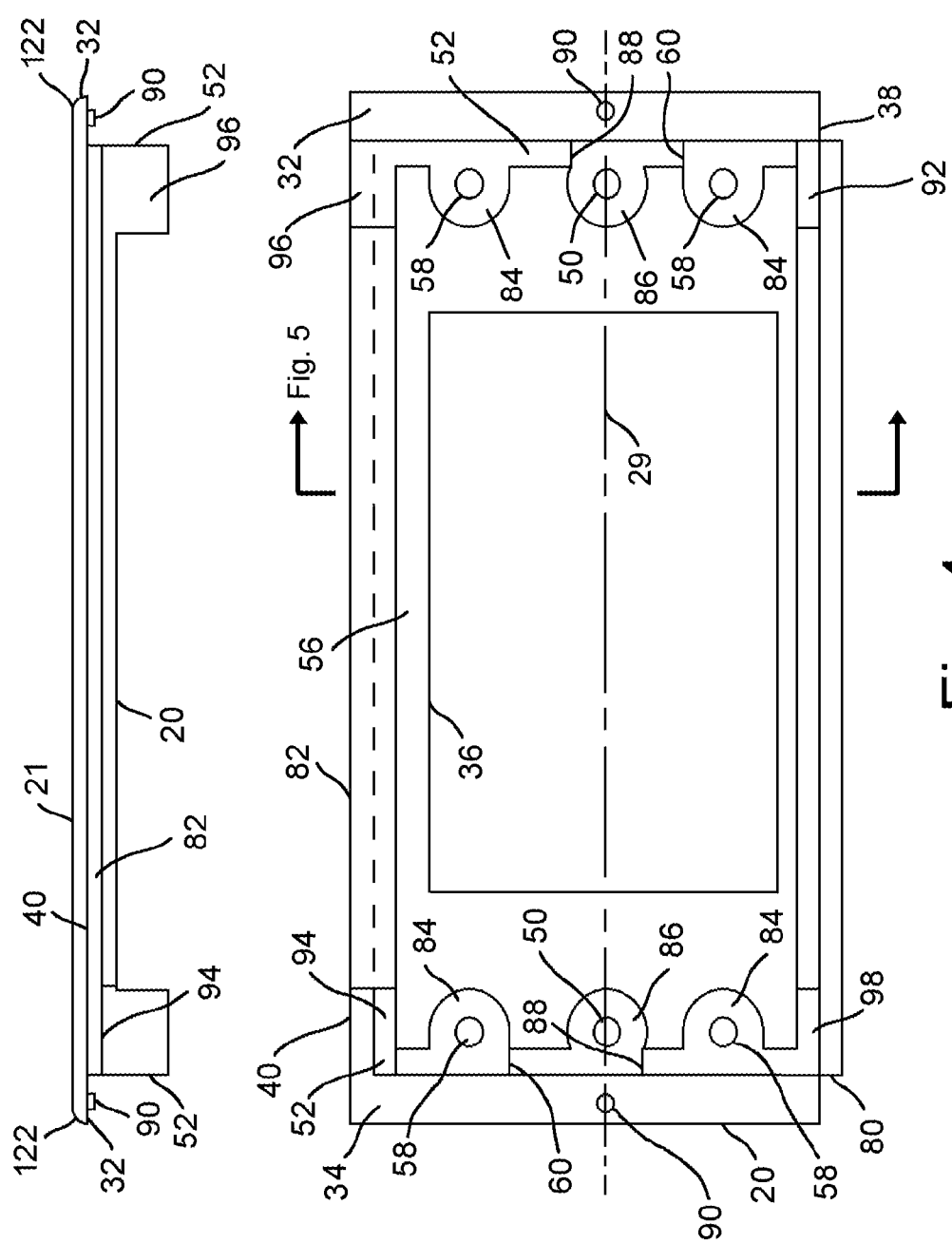

RECONFIGURABLE CONSOLE MOUNT

This application is a Continuation-in-part patent application Ser. No. 12/287,622 filed in the name of the same inventor on Oct. 10, 2008 now U.S. Pat. No. 7,802,832, which is incorporated herein by reference.

FIELD OF THE INVENTION

The present invention relates to vehicle consoles and in particular to one that provides novel reconfigurable equipment mounting features, the console being mountable within a vehicle driver compartment to support either mechanical, electrical or electro-mechanical equipment in a location easily accessible to an operator of the vehicle.

BACKGROUND OF THE INVENTION

Police officers, public safety officers, firefighters, paramedics and the like carry various types of equipment in their vehicles. Several pieces of equipment are often carried in a single vehicle, and the driver often needs to operate the equipment while simultaneously driving the vehicle. Thus, various devices exist to secure multiple pieces of equipment within a vehicle so that they are accessible to the driver and/or other persons in the vehicle driver compartment.

These devices commonly include a hollow rectangular box situated on the floor of the vehicle between the driver seat and front passenger seat, including a horizontal top portion having an upwardly facing opening for receiving pieces of equipment. Police cruisers, for example, are commonly fitted with equipment boxes of this type. The boxes are used to house various types of equipment and controls used by police officers, such as radios, siren controls and light bar controls. Typically, the boxes are sized and positioned so that most of the box extends between the driver seat and the front seat. Only a small portion, if any, of the box will extend forward toward the dashboard beyond the driver seat and front passenger seat. In some police cruisers, the equipment box extends all the way back to the prisoner partition separating the rear seating area from the driver compartment. A laptop computer is often positioned between the box and dashboard, and is secured to the vehicle floor with various types of mounting hardware.

Systems employing the conventional equipment box described above suffer from a number of problems associated with the structure of the box. The box includes removable multiple blank panels fastened on its top or upwardly facing surface. Removal of one or more of these blank panels opens a space where a radio or other piece of equipment can be mounted using brackets that fasten between the piece of equipment and opposing side panels of the box. Unfortunately, the equipment mounting brackets fasten to the box side panels using screws so the equipment is not easily repositioned within the bore or changed out for different pieces of equipment. Furthermore, the blank panels are simple rectangles of heavy sheet metal with squared edges that form butt joints between adjacent panels so gaps are formed between the mounted equipment and adjacent blank panels, and between side by side blank panels when no equipment is mounted.

The conventional equipment box configuration described above makes it more difficult to remove a piece of equipment from this box, or reposition it along closer to one or another of the end panels. The configuration also permits cards and other slim objects such as driver's licenses to slip through the gaps between the mounted equipment and adjacent blank panels, and between side by side blank panels.

SUMMARY OF THE INVENTION

The present invention is a method of configuring a modular console having a plurality of interchangeable overlapping blank and equipment mounting face plates, including both tongue-and-groove joints between adjacent face plates, as well as optional lap joints.

According to one aspect of the method of configuring a modular console, a large quantity of face plates are all originally manufactured, either by injection molding or another suitable manufacturing process, as blank face plates without any cutouts. The blank face plates are originally manufactured in several different widths, for example, a minimum width and different multiples of the minimum width. The blank face plates are stored until an order is received for either blank or equipment mounting face plates. The portion of an order requiring blank face plates of one or more width is filled using off-the-shelf blank face plates of the desired widths. For example, at least some of the equipment pieces to be mounted may be of the surface mount type, whereby a cutout is not necessary for mounting. On the other hand, if an equipment piece requires a cutout, the portion of the order requiring equipment mounting face plates is filled by retrieving off-the-shelf blank face plates of the desired widths, then forming one or more cutouts in any size, quantity and location required to satisfy the order. The one or more cutouts are sized in respective blank face plates to receive there through any desired equipment piece, such as a radio, global positioning sensor (GPS), or siren and light bar controls, or other control switches. As disclosed herein, the cutouts are either sized to industry standards for a particular equipment piece, else custom sized to match a particular brand or model of equipment piece. The cutouts are custom positioned in the face plate to satisfy the desired positioning of the equipment piece to be mounted therein.

The cutouts are formed by cutting through the off-the-shelf blank face plate. The cutting may be accomplished by any suitable manufacturing method, including drilling, sawing, stamping, milling, for example using numerical controlled (NC) milling equipment, water jet cutting, or laser machining. When the off-the-shelf blank face plates are cast, molded, machined or otherwise formed of a nylon, plastic or composite material, programmable water jet cutting or laser machining are ideal cutting processes for customizing cutouts for multiple equipment face plates or just a single one. Alternatively, the off-the-shelf blank face plates are cast, molded, machined or otherwise formed of a metal, such as steel or aluminum, or an alloy.

The utilization of off-the-shelf blank face plates also allows specific positioning of the one or more cutouts in each face plate so that the cutout for the same equipment piece is easily centered in one face plate, while the cutout for the same equipment piece is asymmetrically positioned in another face plate for the same or a different order. Nor do the cutouts have to be similarly shaped, a round cutout for a meter or electrical outlet is easily placed beside a square cutout for a radio and a keyhole cutout for a switch or dial or yet an irregular cutout for a proprietary equipment piece. A speaker grille cutout and associated fastener hole cutouts can be cut into off-the-shelf blank face plates as easily as a rectangular cutout for a standard radio equipment piece. The forming of the cutouts thereby transforms any number of off-the-shelf blank face plates into equipment mounting face plates that are either standardized or customized to receive a selected equipment piece. The forming of the cutouts is optionally accomplished by the original manufacturer of the off-the-shelf blank face plates, else by any of the distributor, the wholesaler, retailer, installer or end user of the console. For example, the distributor, the wholesaler, retailer, installer or end user of the console can form the cutouts in the blank face plate by sawing or drilling using conventional home shop tools. Alternatively, the original manufacturer may partially form one or a series of cutouts in the face plate, for example by cutting from the interior surface thereof part way through the face plate thickness to the outer surface.

When forming of the cutouts is accomplished by the original manufacturer of the off-the-shelf blank face plates, the resulting equipment mounting face plates are bundled with a pair of end panels, and a pair of side panels of desired length. The bundle optionally includes one or more blank face plates to fill any space on an upper surface of the console left empty by the equipment mounting face plates. Such bundling is also contemplated by any of the distributor, wholesaler, or retailer of the console.

This process of forming and storing blank face plates of a few or several integer widths, then transforming the off-the-shelf blank face plates into equipment mounting face plates by forming therein cutouts of desired size and shape and bundling the resulting equipment mounting panels with pairs of end panels and side panels and, optionally, one or more one or more blank face plates to form a custom console results in a truly modular console system that: 1) minimizes inventory, 2) permits filling of large or small orders for different configurations of blank face and equipment mounting face plates with custom cutouts, and 3) permits forming any size cutout to fit different equipment pieces of any size or shape and quantity.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 is an exemplary side view of one equipment mounting face plate;

FIG. 3 is an exemplary end view of one equipment mounting face plate;

FIG. 4 is exemplary bottom view of one equipment mounting face plate;

DETAILED DESCRIPTION OF PREFERRED EMBODIMENT

In the Figures, like numerals indicate like elements.

Figure 1:
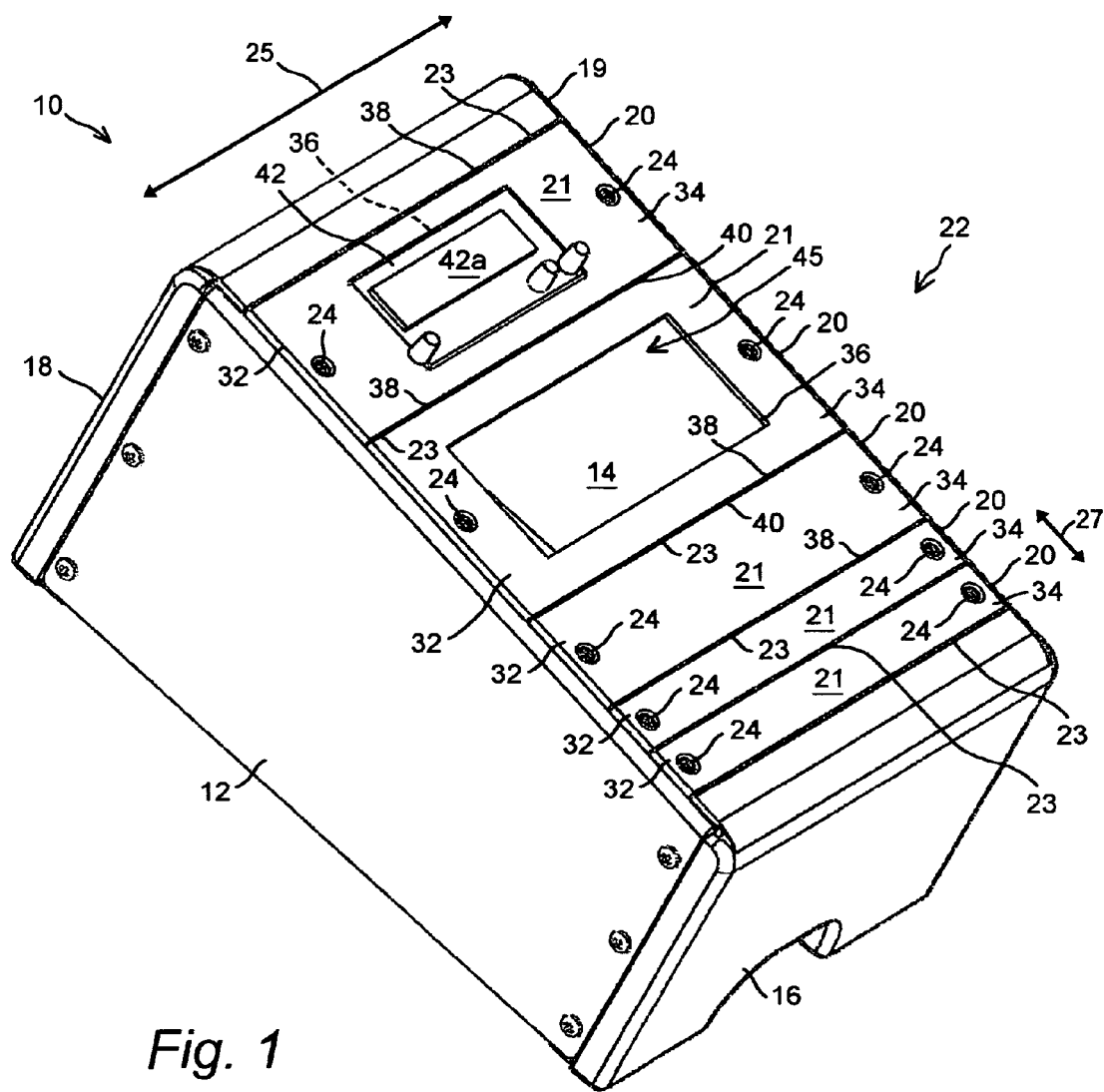
FIG. 1 is a perspective view showing an example of the novel reconfigurable vehicle console.

FIG. 1 is a perspective view that illustrates a novel reconfigurable vehicle console 10 having opposing first and second substantially rigid side panels 12 and 14 each configured for being secured to the drive shaft floor hump of the vehicle using, for example using an interface plate attached to the hump and having a plurality of fastener holes spaced along side flanges arranged along the hump. The side panels 12, 14 are substantially rigidly interconnected with opposing first and second substantially rigid end panels 16 and 18. The side panels 12, 14 and end panels 16, 18 are either integrated in a single continuous frame 19, else joined together to form the console frame 19.

The end panels 16, 18 are substantially the same width such that the side panels 12, 14 are spaced apart a substantially uniform or constant distance between the end panels 16, 18, thereby forming the substantially rectangular console frame 19.

A plurality of substantially interchangeable face plates 20 are removably clamped to the side panels 12, 14 of the rectangular support frame between the opposing end panels 16, 18. For example, a plurality of the interchangeable face plates 20 are removably clamped between the side panels 12, 14 with respective substantially planar external or outer surfaces 21 partially forming a top or upwardly facing surface 22 of the console 10 when installed. The face plates 20 are all of a substantially uniform length 25 between the side panels 12, 14, but are optionally formed with any useful width between the end panels 16, 18. However, the face plates 20 are optionally of a minimum unit width 27 or an integral multiple of the minimum unit width 27. By example and without limitation, the all of the face plates 20 are either a minimum width 27 of about 1 inch, for example, or an integer multiple of the minimum 1 inch width 27, i.e., 2 inch, 3 inch, 4 inch, etc.

A modern surface mount equipment piece 42, such as a radio, global positioning sensor (GPS), is optionally mounted directly on the outer surface 21 of one of the face plates 20. Optionally, one or more cutouts 36 are formed in different face plates 20 for receiving there through the equipment piece 42, such as a radio, global positioning sensor (GPS), or siren and light bar controls, or other control switches. When present, the cutouts 36 are either sized to industry standards for a particular equipment piece 42, else custom sized to match a particular make and model of equipment piece 42. The face plate 20 thus functions as a face plate for the equipment piece 42 being secured thereto, with the cutout 36 functioning as a bezel surrounding an operating face 42a of the equipment piece 42. The cutouts 36 for receiving an equipment piece 42 is substantially the only significant difference between blank face plates 20 and face plates 20 for mounting an equipment piece 42.

Overlapping joints 23 are formed between adjacent face plates 20 along opposing first and second edges 38 and 40 thereof, and additional overlapping joints 23 are formed between end ones of the face plates 20 and respective adjacent end panels 16, 18. In contrast to the butt joints typical in prior art consoles, overlapping joints 23 are distinctly more sealed and secure than such butt joints.

A pair of releasable connectors 24, such as fasteners or releasable clamps, secures opposing side nesting lip portions 32 and 34 of each of the face plates 20 to the side panels 12, 14. Optionally, more of the connectors 24 may be provided for wider face plates 20.

FIG. 2, FIG. 3 and FIG. 4 are exemplary side, end and bottom views, respectively, of one embodiment of face plate 20 having the overlapping joints 23 optionally structured as tongue-and-groove joints. By example and without limitation, the face plate 20 is shown here having a tongue 80 positioned along one of its edges 38 (shown) or 40 and extending most of the length of the face plate 20 between the opposing side nesting lip portions 32, 34. A groove 82 is positioned along the other one of the edges 38 or 40 (shown) of the face plate 20 opposite from and substantially parallel with the tongue 80. The groove 82 is sized to receive and with mate the tongue 80. The groove 82 also extends most of the length of the face plate 20 between the opposing side nesting lip portions 32, 34 and is at least as long as the tongue 80. The tongue 80 and groove 82 of adjacent face plates 20 are joined to form the tongue-and-groove type overlapping joints 23 between adjacent face plates 20. In the tongue-and-groove type joints 23, the tongue 80 is overlapped both above and below by a pair of spaced apart upper support lip 82a and lower support lip 82b that form the groove 82. The upper support lips 82a are positioned adjacent to or flush with the outer surface 21 of the face plate 20. The tongue 80 and groove 82 of end face plates 20 are joined adjacent with end panels 16, 18 to form additional tongue-and-groove type joints 23 there between.

Locators are provided between the side panels 12, 14 and each face plate 20, as disclosed more fully herein below. Accordingly, each of opposing side nesting lip portions 32, 34 of the face plate 20 is further formed with a detent 90 positioned thereon for locating the face plate 20 on the first and second side panels 12, 14 of the console 10, as disclosed herein. By example and without limitation, the detents 90 are positioned in about the middle of the side nesting lip portions 32, 34 substantially equidistant between the edges 38, 40. The detents 90 are thus substantially aligned with a longitudinal centerline 29 of the face plate 20. Alternatively, for wider face plates 20 the detents 90 are offset from the longitudinal centerline 29 by an amount substantially equal to the minimum unit width 27 or a multiple thereof. Optionally, more than one of the detents 90 may be provided at intervals substantially equal to the minimum unit width 27 or a multiple thereof.

Each face plate 20 is further illustrated to have a pair of substantially upright projections 52 positioned on a substantially planar interior surface 56 thereof. Projections 52 function as mounting structure for the equipment piece 42, as discussed herein below. The upright projections 52 are positioned adjacent to and slightly inwardly of respective opposing side nesting lip portions 32, 34 of the face plate 20. The upright projections 52 are optionally formed as thin walls extended substantially completely across the inner surface 56 of the face plate 20 between its opposing edges 38, 40.

A pair of junctions 58 is positioned to the opposing edges 38, 40 and spaced away therefrom along the respective side nesting lip portions 32, 34. By example and without limitation, the junctions 58 are configured as fastener receivers for receiving a threaded fastener thereinto. When configured as fastener receivers, the junctions 58 are, for example, either blind, smooth bore holes structured for receiving self-tapping screws, or pre-threaded blind holes. Optionally, the fastener receiver junctions 58 are formed in thick bosses 84 that are optionally formed integrally with the projections 52 and configured to reinforce and stiffen the projections 52.

A pair of fastener clearance passages 50 are formed in a thick boss 86 formed on the interior surface 56 of the face plate 20, as illustrated. The bosses 86 and fastener clearance passages 50 therein are each positioned at about the middle of the face plate 20 about equidistant between the longitudinal edges 38, 40. The fastener clearance passages 50 are thus substantially aligned with the detents 90. When the pair of connectors 24 securing the face plates 20 to the side panels 12, 14 of the console 10 are configured as releasable clamps, a clearance notch 60 is formed through the upright projections 52 in a position between the respective fastener clearance passage 50 and the respective side nesting lip portions 32, 34 for operating the releasable clamp type connectors 24 there through.

The face plate 20 is further illustrated by example and without limitation to have a first side notch 92 along its tongue edge 38 and a second side notch 94 along its groove edge 40 each adjacent to a respective one of side nesting lip portions 32, 34. Edge portions 96 and 98 of the projections 52 adjacent to respective side nesting lip portions 32, 34 are positioned to coincide with the respective first and second side notches 92, 94 of an adjacent face plate 20 and sized to nest therein. The edge portions 96, 98 of the projections 52 have been found to stiffen the projections 52 and help stabilize the overlapping joints 23 between adjacent face plates 20, but are not necessary for proper functioning of the console 10.

Optionally, the face plate 20 is formed with side edge contours 122, such as rounds or bevels, that avoid dangerous sharp edges and generally smooth the contour of the console 10.

When configure to receive an equipment piece 42, the face plate 20 is additionally formed with one or more cutouts 36 positioned between the side nesting lip portions 32, 34 and opposing first and second edges 38, 40 thereof. The cutouts 36 are sized to receive an equipment piece 42, such as a radio, global positioning sensor (GPS), or siren and light bar controls, there through with the equipment piece 42 being secured to the face plate 20 as disclosed herein. The face plate 20 is thus functions an aesthetic frame and functional support for the equipment piece 42 being secured thereto, with the cutout 36 functioning as a bezel surrounding an operating face 42a of the equipment piece 42.

Figure 5:
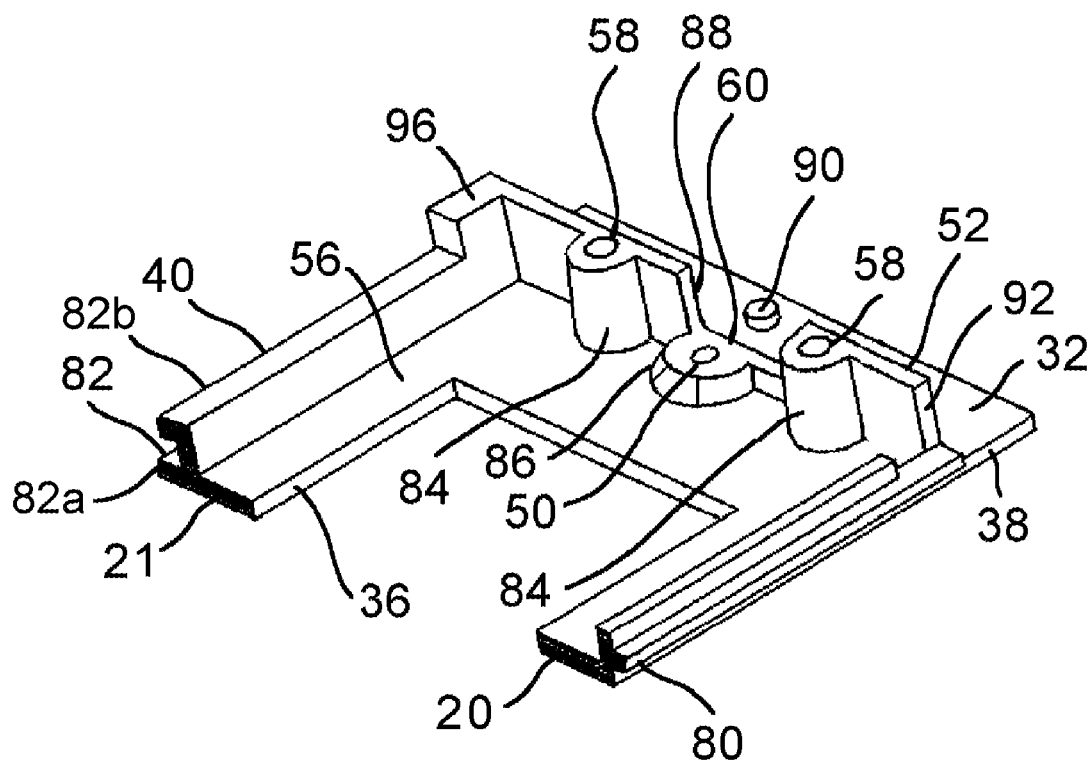
FIG. 5 is a section view taken through one equipment mounting face plate.

FIG. 5 is a section view taken through the face plate 20 showing an illustrative partial bottom perspective view with the cutout 36 shown extending through equipment mounting face plate 20 between the exterior surface 21 and interior surface 56 thereof.

Figure 6:
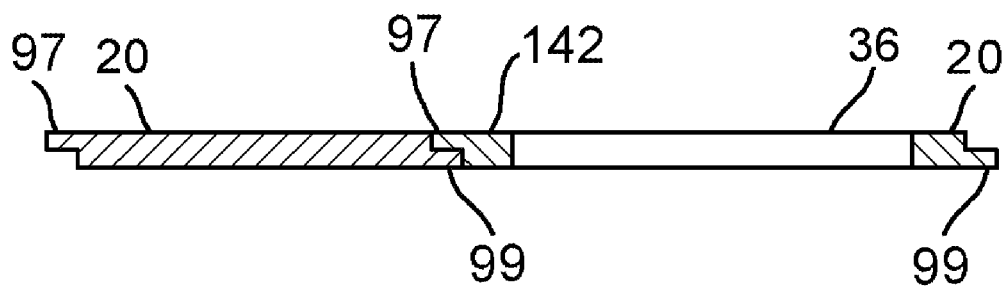
FIG. 6 is a partial cross-section view of the novel reconfigurable vehicle console showing the overlapping joints between adjacent face plates embodied as lap joints.

FIG. 6 illustrates another embodiment of face plate 20 having the overlapping joints 23 alternatively structured as lap joints. Lap type overlapping joints 23 are formed between adjacent face plates 20 along opposing edges 38, 40 thereof. The lap type overlapping joints 23 are also formed between end face plates 20 and an adjacent one of the end panels 16, 18. Lap type overlapping joints 23 are formed of a tongue 97 laying over a lip 99. The tongue 97 is positioned adjacent to or flush with the outer surface 21 of the face plate 20. The lip 99 is positioned opposite from the tongue and adjacent to or flush with the interior surface 56 of the face plate 20. The tongue 97 and lip 99 are optionally both sized about the same, having about the same length and extending about halfway through the thickness of the face plate 20. Optionally, the lip 99 is shorter than the tongue 97 to ensure a smooth, close overlapping joint 23 on the upper surface 22 of the console 10.

Figure 7:
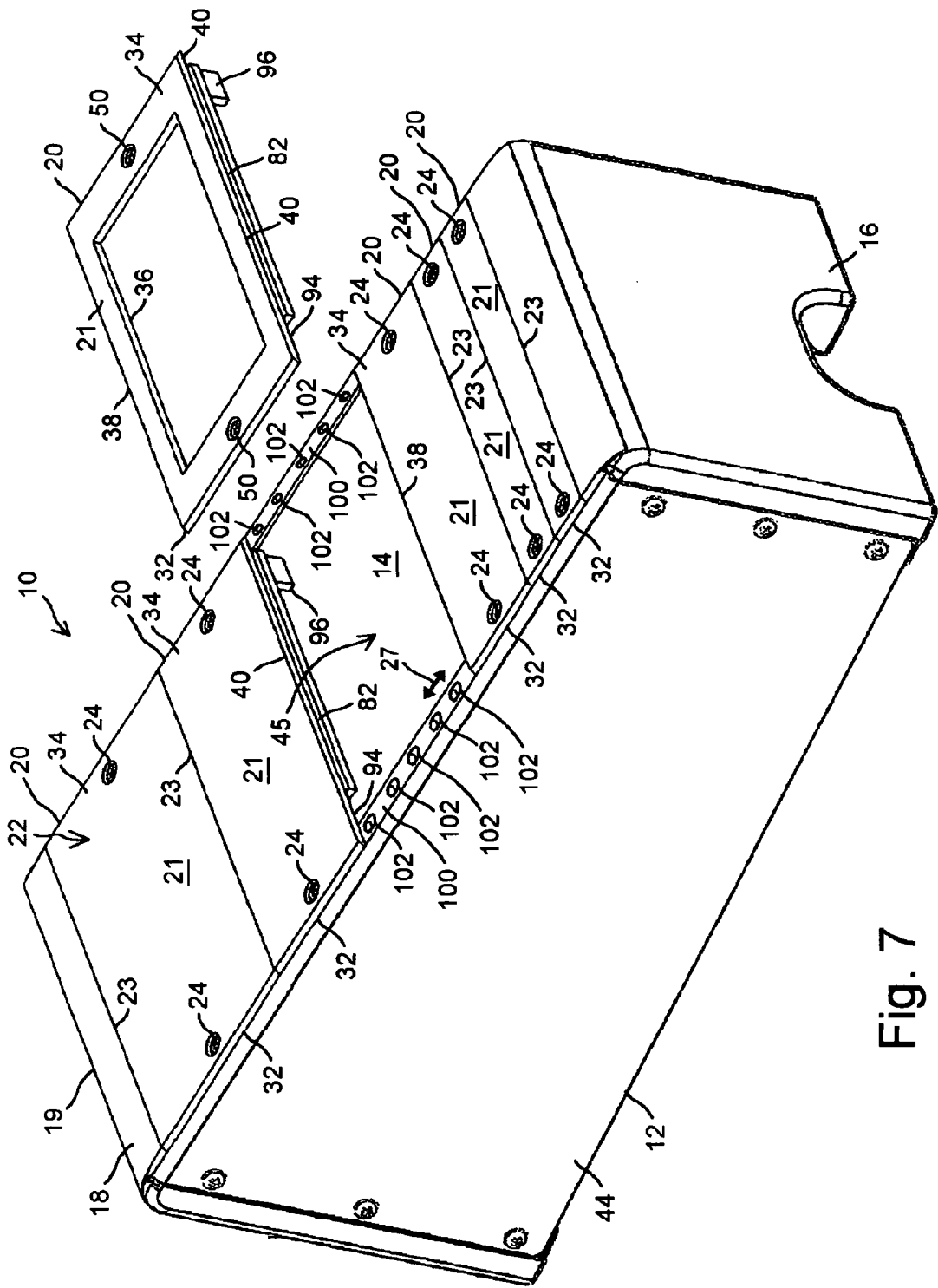
FIG. 7 illustrates installation/removal of one of the removable and interchangeable face plates with the console.

FIG. 7 illustrates installation/removal of one of the face plates 20 with the console 10. As illustrated here, the overlapping joints 23 are formed between adjacent face plates 20 and between end face plates 20 and adjacent console end panels 16, 18. For example, the tongue 80 and groove 82 of each face plate 20 is matable with the groove 82 and tongue 80 of each other face plate 20, and vice versa, to form the tongue-and-groove type overlapping joints 23 there between. The tongue 80 and groove 82 of each face plate 20 is also matable with the tongue and/or groove 80, 82 of the end panels 16, 18 so that any face plate 20 is optionally positioned adjacent to either of the end panels 16, 18 for arranging different blank and equipment bearing face plates 20 as desired. Therefore, the console 10 is optionally fitted with any combination of blank and equipment bearing face plates 20 to suit an end purpose having one or more equipment piece 42 arranged on the console 10 in any order desired.

As illustrated here, side panels 12, 14 are each further formed with an upper mounting lip 100 bent at right angles and facing one another inwardly across the console 10. The end panels 16, 18 space the side panels 12, 14 with a substantially constant separation between their respective mounting lips 100. The mounting lips 100 support the opposing side nesting lip portions 32, 34 of each face plate 20, while providing clamping surfaces for the releasable clamps, fasteners or other releasable connectors 24. Clearance for the two projections 52 on the interior surface 54 of the face plate 20 is provided between the upper mounting lips 100 of the side panels 12, 14. Locators are provided between the mounting lips 100 of the side panels 12, 14 and the opposing side nesting lip portions 32, 34 of each face plate 20. For example, the mounting lips 100 are formed with a plurality of upwardly facing detent receivers 102 spaced substantially uniformly there along for receiving the detents 90 formed on the face plates 20. Furthermore, the detent receivers 102 are positioned at substantially uniform intervals substantially equal to the minimum unit width 27 of the face plates 20 so as to receive any face plates 20 of any minimum or multiple width 27 with no significant gaps between adjacent face plates 20. Only by example and without limitation, the detent receivers 102 are formed as holes spaced slightly away the inwardly facing edge of the mounting lip 100. The hole type receivers 102 are sized to receive the detents 90 of any face plate 20. When the face plates 20 are assembled in the vehicle console 10 with the connectors 24, the detents 90 of the different face plates 20 anchor the side panels 12, 14 by means of the detents 90 being substantially interlocked with the hole type receivers 102 whereby the face plates 20 act as stabilizers between the side panels 12, 14 to stiffen the console 10. Therefore, the side panels can be made thinner and lighter without compromising to the overall stiffness and integrity of the console 10.

Alternatively, the detent receivers 102 are optionally formed as slots or notches that open into the inwardly facing edge of the mounting lip 100. The openings or notches 102 are sized to receive the detents 90 of any of the blank and equipment mounting face plates 20.

After the face plate 20 is mated with the console side panels 12, 14, the connectors 24 are installed to releasably retain each face plate 20 relative to the upper mounting lips 100. Subsequently, the different blank and equipment bearing face plates 20 can be removed and interchanged at will to arrange and rearrange the console 10 as desired. More equipment pieces 42 can be accommodated by utilizing more of the face plates 20 having the cutouts 36, or some of the equipment bearing face plates can be replaced with non-equipment bearing or blank face plates 20. Alternatively, the different equipment pieces 42 can be accommodated by utilizing different face plates 20 of different sizes with cutouts 36 sized and shaped to receive the different equipment pieces 42. Accordingly, in contrast to prior art consoles, the console 10 is truly reconfigurable.

Figure 8:
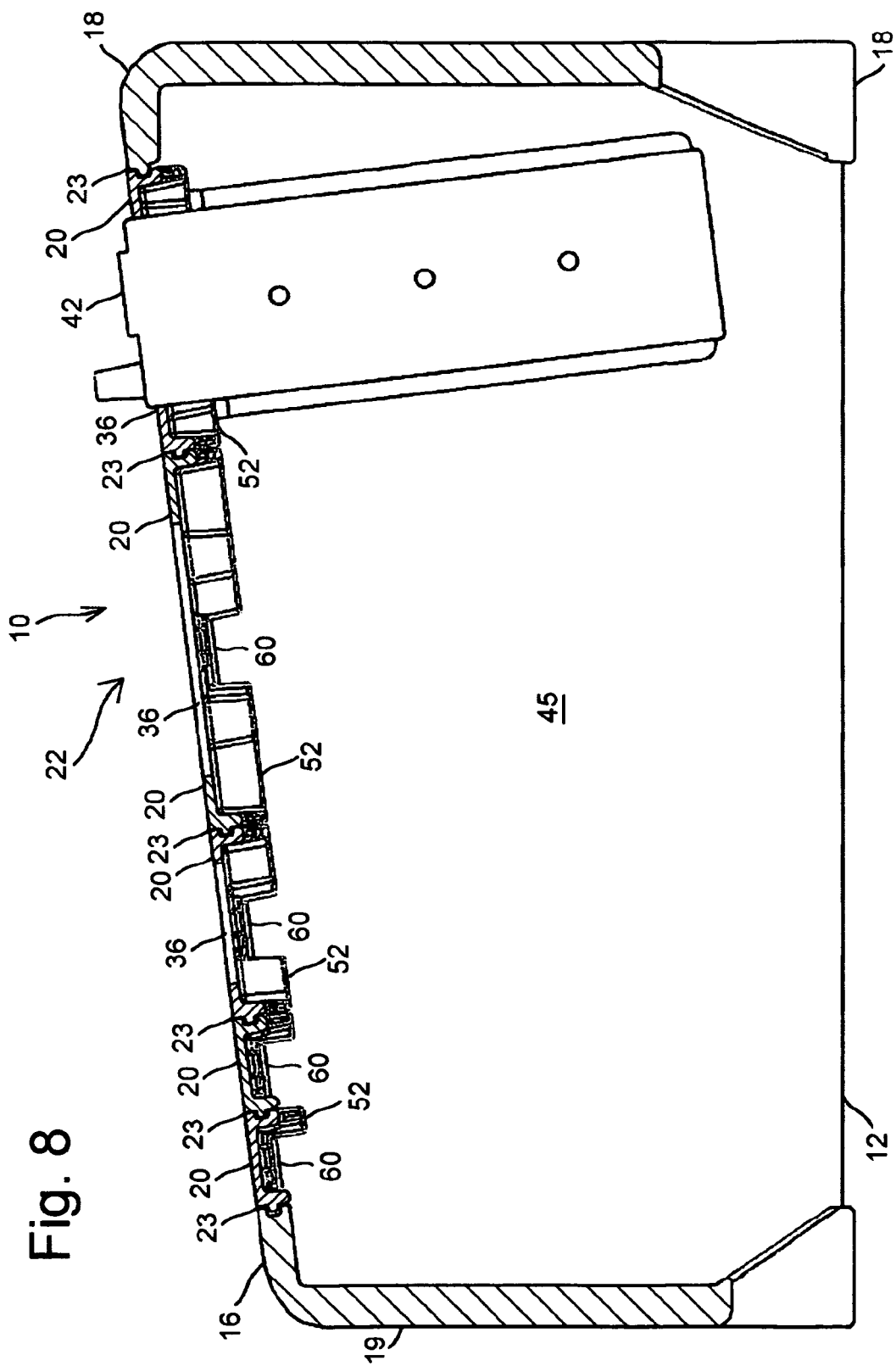
FIG. 8 is a cross-section view of the novel reconfigurable vehicle console showing the overlapping joints between adjacent face plates embodied as tongue-and-groove joints, as disclosed herein.

FIG. 8 is a cross-section view of the console 10 showing the overlapping joints 23 configured as tongue-and-groove joints between adjacent face plates 20, as well as additional tongue-and-groove type overlapping joints 23 between end face plates 20 and adjacent end panels 16, 18, as disclosed herein.

Figure 9:
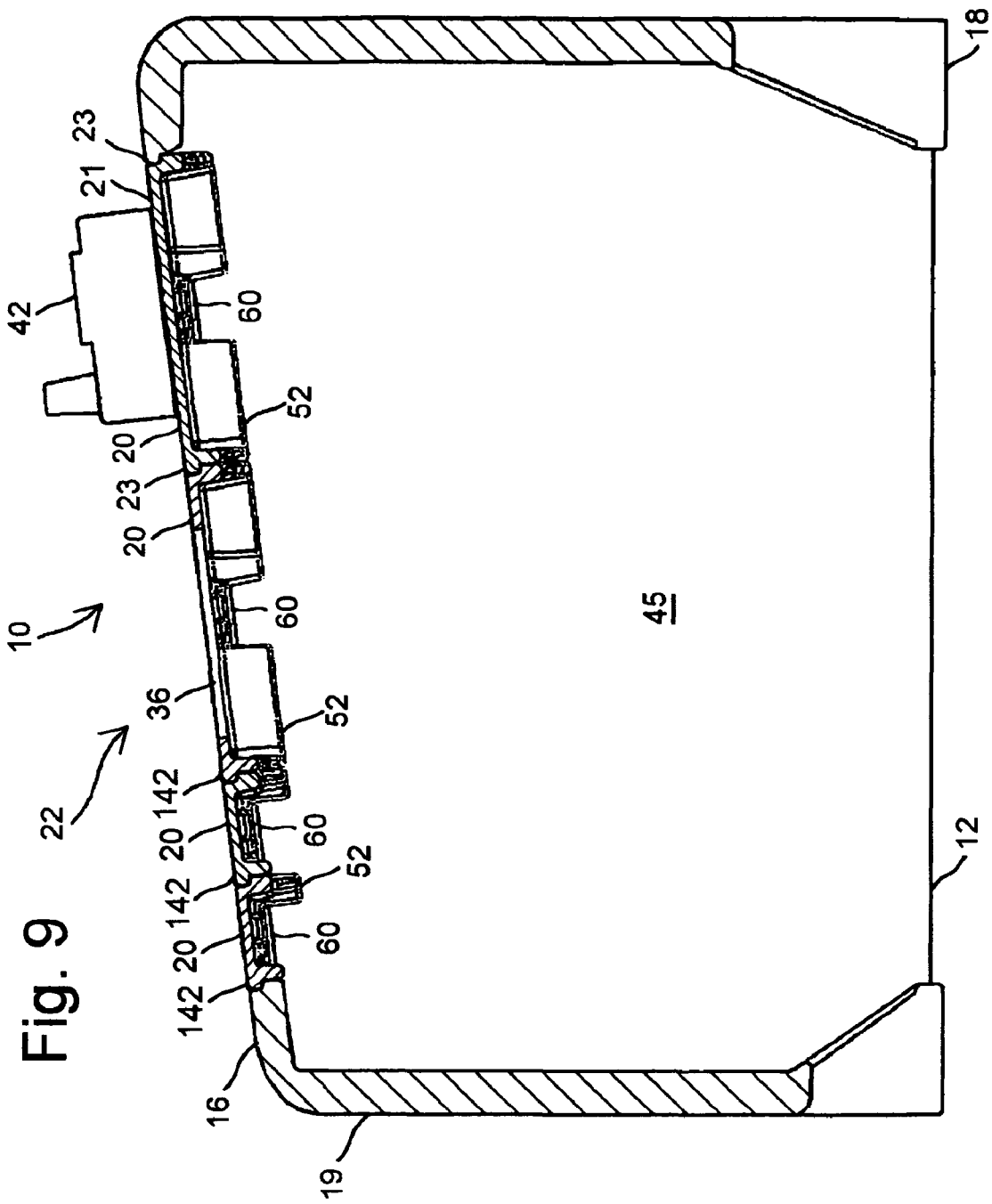
FIG. 9 is a cross-section view of the novel reconfigurable vehicle console showing the overlapping joints between adjacent face plates embodied as lap joints, as disclosed herein.

FIG. 9 is a cross-section view of the console 10 showing the overlapping joints 23 configured as lap joints between adjacent face plates 20, as well as additional lap type joints 23 between end face plates 20 and adjacent end panels 16, 18, as disclosed herein. The equipment piece 42 is also shown here as a modern surface mount type of equipment that is surface mounted on the outer surface 21 of the face plate 20, as by adhesive or mechanical fasteners.

Figure 10:
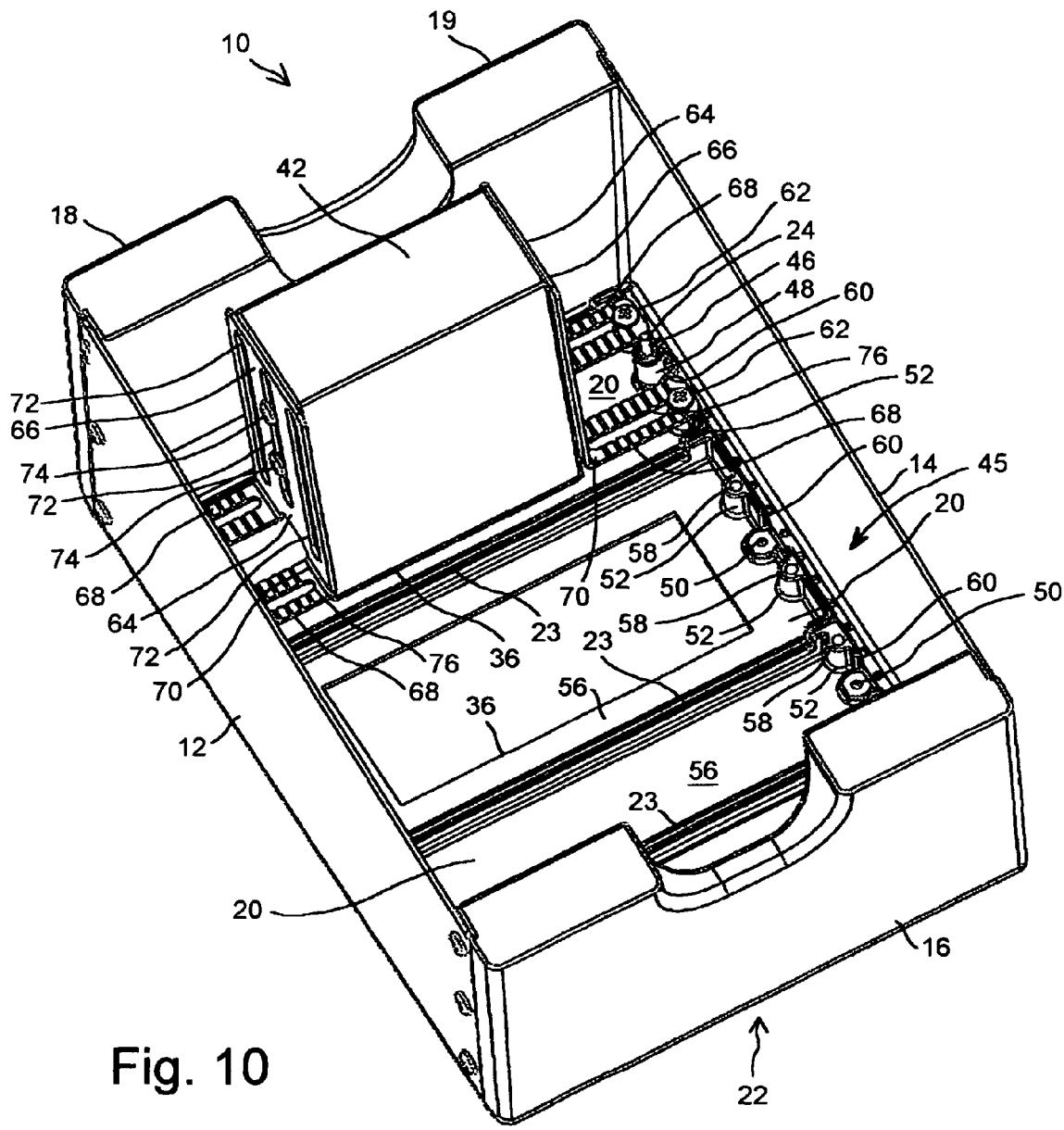
FIG. 10 is a view of the novel reconfigurable vehicle console viewed its underside.

FIG. 10 is a view of the novel reconfigurable vehicle console 10 viewed from the underside opposite from the top or upwardly facing surface 22 and showing the interior portion 45 of the console 10. Here, the connectors 24 are illustrated as releasable clamps having an actuator 46 operable through one of the receivers 50 for engaging or disengaging a movable jaw portion 48. A pair of fasteners 62 secure the equipment piece 42 to the face plate 20 through a pair of substantially rigid L-brackets 64.

Figure 11:
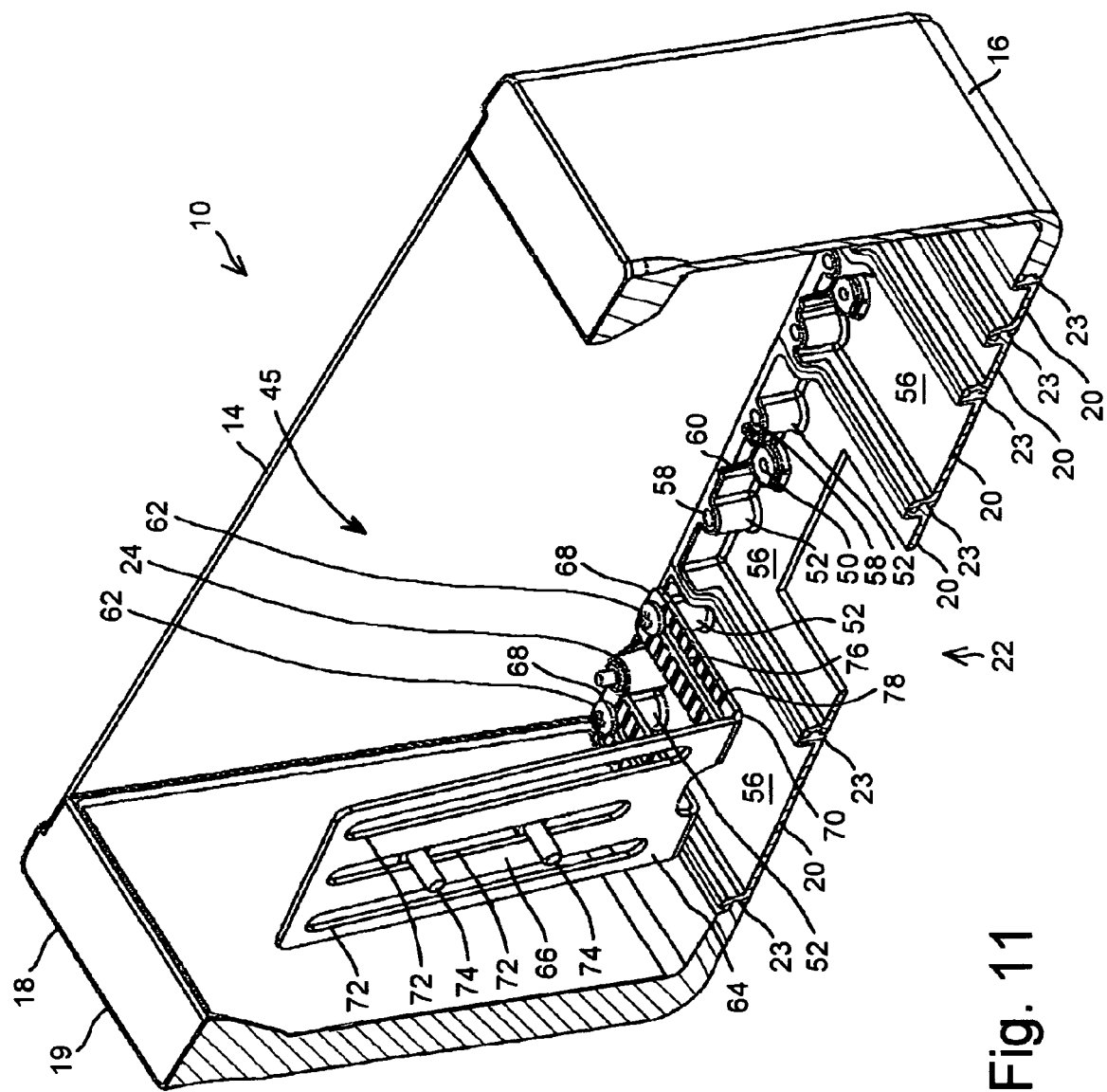
FIG. 11 illustrates one example of a pair of L-brackets that are utilized for securing a piece of equipment relative to a cutout in one of the panels.

FIG. 11 illustrates one example of the pair of substantially rigid L-brackets 64 wherein each is formed of a substantially rigid equipment interface portion 66 and a substantially rigid face plate interface portion 68 that are substantially rigidly interconnected by a substantially rigid angle portion 70 forming a substantially right angle there between. The equipment interface portion 66 is formed with a plurality of substantially parallel equipment interface slots 72 oriented substantially perpendicularly of the right angle portion, and one or more fasteners 74 are utilized for securing the equipment interface portion 66 of each L-bracket 64 to opposite sides of the equipment piece 42.

The face plate interface portion 68 is structured to mount to the face plate 20 by projections 52 thereof. The face plate interface portion 68 is formed with a pair of face plate interface slots 76 oriented substantially perpendicularly of the right angle portion 70 and positioned to substantially align with the pair of fastener receivers 58 of the upright projections 52 positioned on interior surface 56 of the face plate 20. The securing fasteners 62 are received through respective face plate interface slots 76 into the fastener receivers 58 for securing the L-brackets to the inner surface 56 of the face plate 20.

Optionally, the face plate interface portion 68 is split into a pair of spaced apart legs, as shown, each containing one of the pair of face plate interface slots 76. A surface of each leg of the face plate interface portion 68 is optionally further scored by a plurality of substantially parallel grooves or other artifacts 78 across the interface slots 76 at substantially regular intervals between the right angle portion 70 and an outer end of the face plate interface portion 68 distal from right angle portion 70. The scoring grooves 78 are utilized for breaking the legs of the face plate interface portion 68 to a convenient length to fit between the equipment piece 42 mounted on different face plates 20 and the respective side panels 12, 14. The installer merely assembles the equipment piece 42 within one of the cutouts 36 in the face plate 20 using the pair of L-brackets 64, then cuts or breaks off an excess portion of each leg of the face plate interface portion 68 that extends beyond the projections 52 into the zones defined by the respective side nesting lip portions 32, 34. The legs of the face plate interface portion 68 are broken by metal fatigue that occurs by bending along one of the scoring grooves 78, the legs eventually fatigue and break at the scoring groove 78 by repeated bending back an forth. After the legs of the face plate interface portion 68 are broken, the assembly of the equipment piece 42 and equipment face plate 20 fits easily into the space between the side panels 12, 14 of the console 10. The breakable legs of the face plate interface portion 68 permit a single one-size-fits-all L-bracket 64 to be manufactured, stocked and supplied with the console 10, in contrast to custom L-brackets to fit each size of cutout 36, as was practiced in the prior art.

FIG. 11 also more clearly illustrates the tongue-and-groove type joints 23 formed between adjacent face plates 20 and between the end face plates 20 the end panels 16, 18

Figure 12:
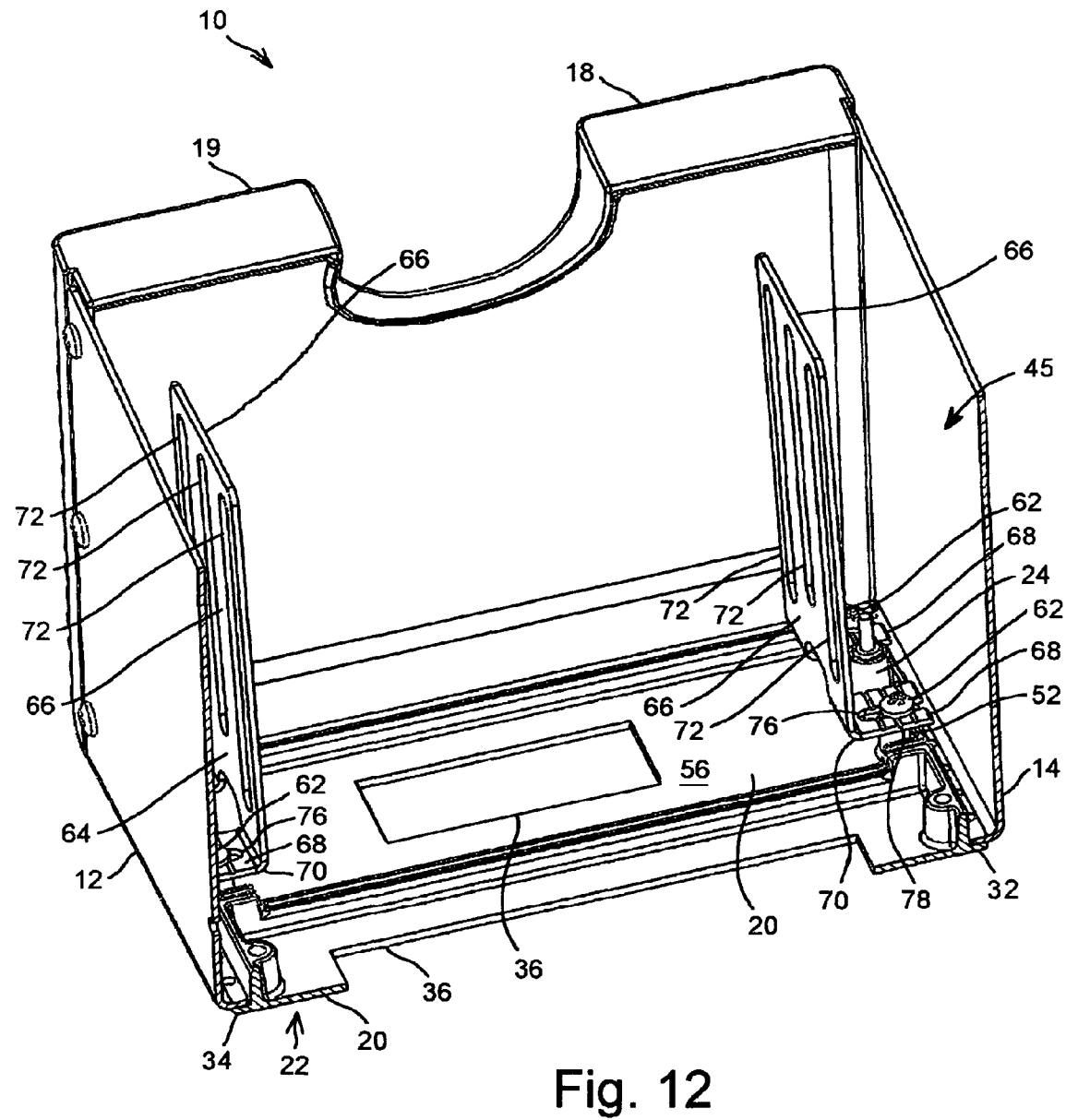
FIG. 12 is a section view of the console normal showing the pair of L-brackets secured to an inner surfaces of an equipment mounting panel.

FIG. 12 is a section view of the console 10 normal to the end panel 18 showing the pair of L-brackets 64 having their respective equipment interface portions 66 each secured to the projections 52 on the inner surfaces 56 of the face plate 20. The L-bracket 64 are shown having their respective equipment interface portions 66 projected away from the top or upwardly facing surface 22 of the console 10 into its interior 45 for supporting the equipment piece 42 (removed for clarity) relative the panel cutout 36.

Method

Face plates of prior art consoles are machined, typically of a steel or aluminum alloy. In contrast, the face plates 20 of the present modular console 10 are molded, for example, of an injection moldable plastic, composite or metal material. The face plates 20 of the present modular console 10 are thus manufactured easily and inexpensively as individual units of relatively rigid molded plastic, composite or metal parts. When molded of nylon, plastic or composite material, the face plates 20 remain substantially rigid as well as tough and sturdy but, in contrast to the prior art, are light weight. The substantially rigid end face plates 20 of the present modular console 10 are thus manufactured easily and inexpensively as individual units of relatively rigid molded plastic, composite or metal parts. Furthermore, injection molding permits the formation of side edge contours 122, such as rounds or bevels, that avoid dangerous sharp edges and generally smooth the contour of the console 10.

According to one embodiment, the face plates 20 are all originally manufactured, either by injection molding or another suitable manufacturing process, as blank face plates 20 without any of the one or more cutouts 36. The blank face plates 20 are originally manufactured in several different widths, for example, the minimum width 27 and different multiples of the minimum width 27. The blank face plates 20 are stored until an order is received for either blank or equipment mounting face plates 20. The portion of an order requiring blank face plates 20 of one or more width 27 is filled using off-the-shelf blank face plates 20 of the desired widths. For example, the equipment pieces 42 may be exclusively of the surface mount type shown in FIG. 9, whereby the cutout 36 is not necessary for mounting. On the other hand, if an equipment piece 42 requires the cutout 36, the portion of the order requiring equipment mounting face plates 20 with one or more cutouts 36 is filled by retrieving off-the-shelf blank face plates 20 of the desired widths, then forming the one or more cutouts 36 in any size, quantity and location required to satisfy the order. The one or more cutouts 36 are sized in respective blank face plates 20 to receive there through any desired equipment piece 42, such as a radio, global positioning sensor (GPS), or siren and light bar controls, or other control switches. As disclosed herein, the cutouts 36 are either sized to industry standards for a particular equipment piece 42, else custom sized to match a particular brand or model of equipment piece 42. The cutouts 36 are custom positioned in the face plate 20 to satisfy the desired positioning of the equipment piece 42 to be mounted therein.

The cutouts 36 are formed by cutting through the off-the-shelf blank face plate 20. The cutting may be accomplished by any suitable manufacturing method, including drilling, sawing, stamping, milling, for example using numerical controlled (NC) milling equipment, water jet cutting, or laser machining. When the off-the-shelf blank face plates 20 are cast, molded, machined or otherwise formed of a nylon, plastic or composite material, programmable water jet cutting or laser machining are ideal cutting processes for customizing cutouts 36 for multiple equipment face plates 20 or just a single one.

Alternatively, the off-the-shelf blank face plates 20 are cast, molded, machined or otherwise formed of a metal, such as steel or aluminum, or an alloy The utilization of off-the-shelf blank face plates 20 also allows specific positioning of the one or more cutouts 36 in each face plate 20 so that the cutout 36 for the same equipment piece 42 is easily centered in one face plate 20, while the cutout 36 for the same equipment piece 42 is asymmetrically positioned in another face plate 20 for the same or a different order. Nor do the cutouts 36 have to be similarly shaped, a round cutout 36 for a meter or electrical outlet is easily placed beside a square cutout 36 for a radio and a keyhole cutout 36 for a switch or dial or yet an irregular cutout 36 for a proprietary equipment piece 42. A speaker grille cutout 36 and associated fastener hole cutouts 36 can be cut into off-the-shelf blank face plates 20 as easily as a rectangular cutout 36 for a standard radio equipment piece 42. The forming of the cutouts 36 thereby transforms any number of off-the-shelf blank face plates 20 into equipment mounting face plates 20 that are either standardized or customized to receive a selected equipment piece 42. The forming of the cutouts 36 is optionally accomplished by the original manufacturer of the off-the-shelf blank face plates 20, else by any of the distributor, the wholesaler, retailer, installer or end user of the console 10. For example, the distributor, the wholesaler, retailer, installer or end user of the console 10 can form the cutouts 36 in the blank face plate 20 by sawing or drilling using conventional home shop tools. Alternatively, the original manufacturer may partially form one or a series of cutouts 36 in the face plate 20, for example by cutting from the interior surface 56 thereof part way through the face plate thickness to the outer surface 21.

When forming of the cutouts 36 is accomplished by the original manufacturer of the off-the-shelf blank face plates 20, the resulting equipment mounting face plates 20 are bundled with the first and second end panels 16, 18, and a pair of side panels 12, 14 of desired length. The bundle optionally includes one or more blank face plates 20 to fill any space on the upper surface 22 of the console 10 left empty by the equipment mounting face plates 20. Such bundling is also contemplated by any of the distributor, wholesaler, or retailer of the console 10.

This process of forming and storing blank face plates 20 of a few or several integer widths 27, then transforming the off-the-shelf blank face plates 20 into equipment mounting face plates 20 by forming therein cutouts 36 of desired size and shape and bundling the resulting equipment mounting panels 30 with pairs of end panels 16, 18 and side panels 12, 14 and, optionally, one or more one or more blank face plates 20 to form a custom console 10 results in a truly modular console system that: 1) minimizes inventory, 2) permits filling of large or small orders for different configurations of blank face and equipment mounting face plates 20 with custom cutouts 36, and 3) permits forming any size cutout 36 to fit different equipment pieces 42 of any size or shape and quantity.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A method of configuring a modular console, comprising:
    forming a plurality of substantially continuous and uninterrupted face plates, and further comprising forming a tongue along a first joining edge thereof, and forming a support lip formed along a second joining edge thereof opposite from the first joining edge and positioned to mate with the tongue of a different one of the face plates;
    providing a console frame comprising two opposing side panels and two opposing end panels with a substantially constant separation between opposing mounting portions of the two side panels; and
    coupling a plurality of the face plates to the mounting portions of the two side panels between the two opposing end panels.

2. The method of claim 1 wherein the coupling a plurality of the face plates to the mounting portions of the two side panels further comprises releasably coupling the plurality of the face plates to the mounting portions of the two side panels.

3. The method of claim 2, further comprising forming a detent between each of the face plates and the mounting portions of each of the two side panels.

4. The method of claim 2 wherein the providing a console frame further comprises interconnecting opposing end portions of the two side panels with the two opposing end panels.

5. The method of claim 2, further comprising storing the plurality of face plates after the forming thereof, and subsequently forming a cutout in at least one of the face plates.

6. The method of claim 2 wherein the forming a plurality of face plates further comprises forming the face plates with a width between the first and second joining edges thereof, the width being one of: a unit width, and an integer multiple of the unit width.

7. The method of claim 6 wherein the forming a plurality of face plates further comprises forming the width of at least one of the plurality of face plates different than the width of a different one of the plurality of face plates.

8. The method of claim 1, further comprising forming one of the two end panels with a tongue along an edge thereof between the mounting portions of the two side panels and positioned to mate with the support lip of one of the interchangeable face plates, and
    forming a different one of the two end panels with a support lip positioned along an edge thereof between the mounting portions of the two side panels and positioned to mate with the tongue of one of the face plates.

9. The method of claim 1 wherein the forming a plurality of face plates further comprises forming a groove along the second joining edge thereof by forming a pair of the support lips there along, the groove being sized to receive therein the tongue of the different one of the face plates.

10. The method of claim 9, further comprising forming one of the two end panels with a tongue along an edge thereof between the mounting portions of the two side panels and positioned to mate with the support lip of one of the interchangeable face plates, and
    forming a different one of the two end panels with a pair of support lips positioned along an edge thereof between the mounting portions of the two side panels and positioned to mate with the tongue of one of the interchangeable face plates, the pair of support lips being spaced apart to receive the tongue there between.

11. A method of configuring a modular console, comprising:
    forming a console frame comprising a pair of substantially rigid end panels joined with a pair of substantially rigid side panels, each side panel further comprising an upright wall portion terminating in a mounting lip portion formed along a length thereof, and a substantially constant separation between the mounting lip portions;
    molding a plurality of substantially rectangular face plates each comprising opposing side nesting lip portions positioned to nest with the mounting lip portions of the pair of side panels, and further comprising:
        molding a tongue along a first joining edge thereof between the opposing side nesting lip portions,
        molding a support lip along a second joining edge between the opposing side nesting lip portions thereof opposite from the tongue and structured to mate in a lap joint with the tongue of a different one of the face plates, and
        forming a clearance passage between inner and outer surfaces thereof and spaced inwardly of each of the side nesting lip portions;
    operating a releasable connector through the clearance passages of one of the face plates, and connecting the respective side nesting lip portions with the mounting lip portions of the respective side panels.

12. The method of claim 11, further comprising forming a detent between the side nesting lip portions and the respective mounting lip portions of the side panels.

13. The method of claim 12 wherein the molding a plurality of substantially rectangular face plates further comprises molding one of the face plates with a unit width between the first and second joining edges thereof, and molding a different one of the face plates with an integer multiple of the unit width between the first and second joining edges thereof; and
    wherein the connecting the pair of side panels to the pair of end panels further comprises spacing apart at least a portion of the end panels adjacent to the respective mounting lip portions of the side panels by a distance that is substantially equal to a plural integer multiple of the unit width between the first and second joining edges of the face plate.

14. The method of claim 13 wherein the forming a pair of substantially rigid end panels further comprises: forming a tongue along a joining edge of one of the pair of end panels positioned between the mounting lip portions of the side panels for mating in a lap joint with the support lip of one of the face plates, and
    forming a support lip along a joining edge of a different one of the pair of end panels between the mounting lip portions of the side panels for mating in a lap joint with the tongue of one of the face plates.

15. The method of claim 13 wherein the molding a tongue along a first joining edge of the face plate further comprises offsetting the tongue relative to the outer surface thereof, and
    wherein the molding a support lip along a second joining edge of the face plate further comprises molding a pair of spaced apart support lips along the second joining edge thereof for receiving there between the tongue of the different one of the face plates.

16. The method of claim 15 wherein the forming a pair of substantially rigid end panels further comprises: forming a tongue along a joining edge of one of the pair of end panels positioned between the mounting lip portions of the side panels for mating in a lap joint with the support lip of one of the face plates, and forming a pair of spaced apart support lips along a joining edge of a different one of the pair of end panels between the mounting lip portions of the side panels for receiving there between the tongue of one of the face plates.

17. The method of claim 11, further comprising in at least one of the face plates forming a cutout formed between the inner and outer surfaces thereof and sized to receive an equipment piece at least partially there through, and further forming a pair of substantially upright projections on the inner surface thereof between the first and second joining edges adjacent to the respective side nesting lip portions, each projection further comprising a pair of fastener receivers positioned on opposite sides of the respective clearance passage.

18. A method of configuring a modular console, comprising:

forming first and second substantially rigid end panels, and further comprising forming the first end panel with a tongue along a joining edge thereof and forming the second end panel with a support lip portion along a joining edge thereof;

forming a pair of substantially rigid side panels each comprising a substantially rigid mounting lip portion along one edge thereof, the pair of side panels being interconnectable with the end panels having the respective mounting lip portions thereof spaced apart a substantially uniform distance;

forming a plurality of substantially rectangular face plates each having a substantially planar outer surface and an opposing inner surface, and further comprising:

forming each of the face plates with opposing first and second joining edges spaced apart by a width that is substantially equal to an integer multiple of a minimum unit width, forming each of the face plates with a tongue extended along the first joining edge thereof in a position to be received on the support lip of the second end panel, forming each of the face plates with a support lip along the second joining edge thereof in a position to receive thereover the tongue of the first end panel, forming each of the face plates with opposing side nesting lip portions adjacent to opposite ends thereof between the opposing first and second joining edges thereof in a position to be received on a respective one of the mounting lip portions of the side panels, forming each of the face plates with connector clearance passages adjacent to each of the side nesting lip portions, forming substantially upright projections on the inner surface of at least one of the face plates adjacent to each of the side nesting lip portions, and further comprising forming a pair of fastener receivers on opposite sides of the respective connector clearance passage, and at least one cutout communicating between the opposing inner and outer surfaces;

interconnecting the pair of side panels with the end panels having the tongue of the first end panel facing toward the support lip of the second end panel, and having the respective mounting lip portions of the side panels spaced apart a substantially uniform distance;

positioning a plurality of the face plates on the side panels with respective side nesting lip portions seated on the mounting lip portions thereof, and further comprising:

receiving the tongue of one of the face plates over the support lip of the second end panel, receiving the tongue of the first end panel over the support lip of a different one of the face plates, receiving the tongue of each of a remainder of the plurality of face plates over the support lip of a different one of the face plates positioned adjacent thereto; and releasably connecting each of the face plates to the respective mounting lip portions of the side panels by operating releasable connectors through the connector clearance passages.

19. The method of claim 18 wherein the forming a plurality of substantially rectangular face plates further comprises forming a detent interconnectable between each of the side nesting lip portions thereof and the mounting lip portions of the respective side panels.

20. The method of claim 18 wherein the forming a plurality of substantially rectangular face plates further comprises molding the face plates.

21. The method of claim 18 wherein the forming the end panels further comprises forming a cover lip spaced apart from the support lip and forming a groove therewith sized to receive therein the tongue of one of the face plates; and wherein the forming each of the face plates with a support lip along the second joining edge thereof further comprises forming a cover lip formed along the second joining edge thereof spaced apart from the support lip and forming a groove therewith sized to receive there under the tongue of the end panel.

\* \* \* \* \*